(12) United States Patent
Moessner et al.

(10) Patent No.: US 8,464,016 B2
(45) Date of Patent: Jun. 11, 2013

(54) METHOD AND DEVICE FOR SWITCHING OVER IN A MEMORY FOR A CONTROL DEVICE

(75) Inventors: Claus Moessner, Ispringen (DE); Gert Maier, Reutlingen (DE); Claus Spizig, Stuttgart (DE); Frank Lustig, Stuttgart (DE); Jens Schneider, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 667 days.

(21) Appl. No.: 11/921,132

(22) PCT Filed: May 22, 2006

(86) PCT No.: PCT/EP2006/062487
§ 371 (c)(1),
(2), (4) Date: Mar. 17, 2009

(87) PCT Pub. No.: WO2006/125760
PCT Pub. Date: Nov. 30, 2006

(65) Prior Publication Data
US 2009/0307454 A1    Dec. 10, 2009

(30) Foreign Application Priority Data

May 25, 2005   (DE) .......................... 10 2005 024 618
Dec. 14, 2005   (DE) .......................... 10 2005 059 593

(51) Int. Cl.
*G06F 12/00* (2006.01)
(52) U.S. Cl.
USPC ............. 711/170; 711/E12.049; 711/E12.084
(58) Field of Classification Search
USPC ........................................................ 711/170
See application file for complete search history.

(56) References Cited

U.S. PATENT DOCUMENTS

| 3,753,242 | A  | * | 8/1973 | Townsend ......................... 711/5 |
| 4,484,275 | A  | * | 11/1984 | Katzman et al. ................ 710/40 |
| 5,970,251 | A  |   | 10/1999 | Zimmermann et al. |
| 6,141,726 | A  |   | 10/2000 | Dell |
| 6,438,672 | B1 | * | 8/2002 | Fischer et al. ................ 711/210 |
| 2001/0032038 | A1 |   | 10/2001 | Eiting et al. |
| 2005/0097297 | A1 | * | 5/2005 | Hoshina ........................ 711/170 |
| 2005/0223159 | A1 | * | 10/2005 | Fukami et al. ................ 711/103 |

FOREIGN PATENT DOCUMENTS

| DE | 39 17 979 | 12/1990 |
| DE | 41 07 052 | 9/1992 |
| DE | 197 37 182 | 3/1999 |
| EP | 0 765 495 | 4/1997 |
| WO | WO 00/10060 | 2/2000 |

OTHER PUBLICATIONS

International Search Report, PCT International Patent Application No. PCT/EP2006/062487, dated Mar. 5, 2007.

* cited by examiner

*Primary Examiner* — Reginald Bragdon
*Assistant Examiner* — Aracelis Ruiz
(74) *Attorney, Agent, or Firm* — Kenyon & Kenyon LLP

(57) ABSTRACT

A method and device for switching over in a memory for a control device, a first storage area in the control unit being overlaid by a second storage area; the second storage area including at least one memory page, and each of the memory pages being able to overlay the first storage area; switching over being able to be performed between the memory pages and the overlaying being able to be switched on/switched off, and the switching over of the memory pages and the switching on/switching off of the overlaying of the second storage area being automatically carried out and/or triggered by the software of the control unit.

19 Claims, 2 Drawing Sheets

METHOD AND DEVICE FOR SWITCHING OVER IN A MEMORY FOR A CONTROL DEVICE

FIELD OF THE INVENTION

The present invention relates to a method and a device for switching over in a memory for a control device, e.g., a first storage area in the control unit being overlaid by a second storage area. The present invention also relates to a computer program having program code, particularly stored on a computer-readable data carrier.

BACKGROUND INFORMATION

In control units, particularly in a motor vehicle, an existing memory, particularly a read-only memory is replaced or faded out in order thereby to be able to adjust values or make settings while the control unit is in operation. Besides motor vehicle control units, other control units are also conceivable in this context, such as aviation units or even machine tools and machining centers, control units of automation technology, etc.

Such an emulation device for a control unit is described in German Published Patent Application No. 39 17 979, a data manipulating device being provided and an external and, particularly, a serial interface of the operator unit of the control unit for changing data of a read-write memory that is contained in the control unit. A switching device is provided for switching the read access in the data manipulation device, which switches over, on the one hand, between the read-write memory, and on the other hand a data program read memory.

In the same vein, German Published Patent Application No. 41 07 052 describes a device for the application of control units in which, likewise, the data/program read memory of the control unit is replaced by a data manipulation device having a read-write memory, to which likewise an operator unit is connected via a serial interface. Here too, a switching device is provided in which the read-write memory is connected in a first cycle to the control unit for reading out data, and in a second cycle to the serial interface for reading in or reading out data.

The switching over between the memories is performed by the connected application unit, in this instance. In some microcontrollers, the overlaying memory is made up of several regions, in this context, which are able to be activated only region by region. In the process, it is frequently not preventable that the control unit program accesses inconsistent data during the switching over between the regions. This is conditioned upon the fact that, because of the successive switching in of the regions, an intermediate reading comes about, with regard to the overlaid storage area, during the switching over process which does not correspond to the desired final state of the data. Thus, the control unit program accesses data which in part are made up of various storage areas and various regions. Because of this overlapping, what may happen is that the control unit software makes calculations using wrong data, which may lead to a corrupted result, and in the worst case even to a program crash.

Thus, conventional arrangements have not been able to yield optimum results in all regards.

SUMMARY

Therefore, example embodiments of the present invention address this situation, and provide a method and a device for switching over in a memory for a control unit, in which the mentioned data inconsistencies are able to be avoided.

Example embodiments of the present invention provide a method and a device for switching over in a memory for a control unit, a first storage area in the control unit being overlaid by a second storage area; the second storage area including one or more recording surfaces, and, e.g., each of the recording surfaces being able to overlay the first storage area; switching over being able to be performed between the recording surfaces and/or the overlaying being able to be switched on or off (EA), and the switching over of the recording surfaces of the second storage area being automatically carried out by the software of the control device. That is, for reasons of security, there is a second recording surface or the original store-and-forward mode is used as the default mode, in order to return the system controlled by the control unit to a more secure state, if necessary, specifically by switching over to another recording surface or by terminating the overlaying of the storage area, so as to unhide the original data again. According to example embodiments of the present invention, the switching over of the surfaces and the fading out of the storage area are performed by the control unit software, in this instance. Because the control unit software triggers and/or executes the switching over and the fading out of the storage area, it may be ensured that no access to inconsistent data takes place, since no third entity is able to generate data inconsistencies by switchover triggering. In general usage, the fading out of the storage area by a recording surface is also called page switching, since this procedure is similar to switching over between two memory pages, one having the same content as the area that is to be faded out. Therefore, in the following the fading out of the storage area by a page is designated as switching the page.

The switching over of the memory pages may be called for by the applications system, namely, expediently such that the applications system calls for the switching over by writing a switching identifier into a specified storage location of the control unit, the storage location not being used in the overlaying.

This means, therefore, that the applications system calls for a switching over of the pages by writing a message into a declared storage location of the control unit.

It may be provided that the switching over, that has occurred, of the memory pages by the software of the control unit is acknowledged, and this may be done by the software of the control unit writing an acknowledgement identifier into a specified storage location, which is also not used in the overlaying. In this context, the same or even a different storage location with respect to the acknowledgment identifier and the switching identifier may be involved. Thus, the control unit software may return only one acknowledgment on the success of the page switching by writing a message into a storage location. The applications system is able to interpret this response.

In an example embodiment, the first storage area of the control unit that is overlaid by the second storage area is able to be changed during the operation of the control unit in that the control unit changes or customizes this first storage area by using an overlay configuration table.

This means that it may be provided for the application system to change the area of the memory that is being overlaid, during the operation. This broadened control of the page configuration by the applications system is achieved by the control unit having an overlay configuration table imparted to it.

It may also be provided, in this context, that the control unit processes the overlay configuration table in response to an initialization process, that is, especially at the start of the control unit, and thus, immediately upon the initialization, the first storage area is overlaid by the second storage area, and the control unit software is already processing the overlay configuration table during booting up. To do this, it may be provided that the overlay configuration table is stored in a storage area or in a storage location which continues to hold the stored data even after shutdown of the system or in response to power loss, which is achievable especially by a floated battery, etc.

Example embodiments of the present invention are described below with reference to the figures illustrated in the drawing.

DETAILED DESCRIPTION

Figure 1:
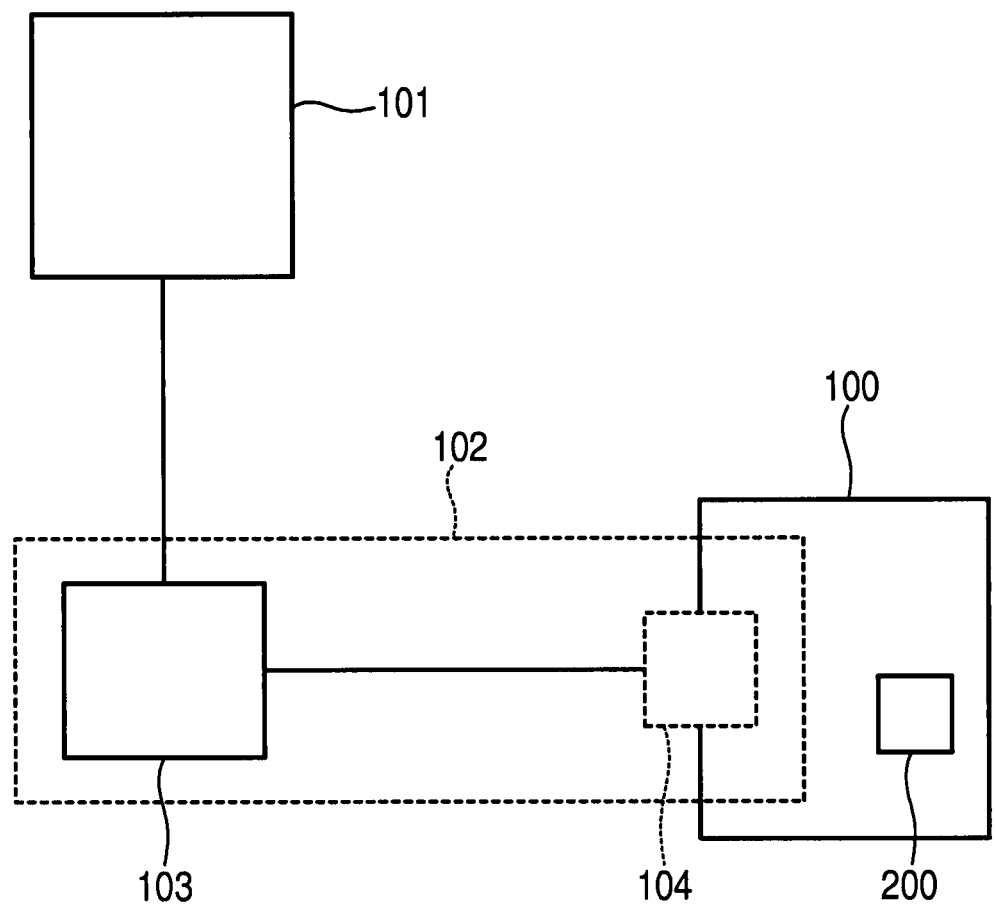
FIG. 1 illustrates the exemplary design of a measuring and/or applications system, as it may be used according to example embodiments of the present invention.

FIG. 1 shows an exemplary construction that is used for measuring systems and/or application systems. In it, 100 shows a control unit in which at least one storage area is to be overlaid. The application unit or measuring unit, by which modifications, measurements and sequence changes are to be carried out, is designated by 101. This unit, subsequently designated as application unit 101, is connected to control unit 100 via additional hardware 102. In one special embodiment, hardware 102 can be made up of a conversion box 103 and emulation hardware 104. In this context, emulation hardware 104 may in particular be an ETK, an emulation probe. Then, in conversion box 103, there takes place the signal conversion between application unit 101 and control unit 100 with respect to emulation hardware 104. The application unit may particularly be a PC, laptop, etc. that is sold in the trade.

The partitioning of the hardware into a part outside and a part inside the control unit is only exemplary, and is not intended in any way to restrict the subject matter of the present invention to the extent that a definite partitioning is absolutely prescribed. Thus, for one, conversion box 103 may be omitted and, besides the connection, for instance, via the emulation probe with regard to component 104, it is also possible to have a connection to another method, such as to a bus connection such as a CAN (controller area network), a USB (universal serial bus), a Flex Ray, TTCAN (time triggered controller area network) or even an XCP. That is why component 104 may be regarded as optional and may be considered to be both within the control unit and outside of it, and only connected to control unit 100. One example variant is the use of emulation hardware such as an emulation probe, a conversion box 103 for connecting application unit 101 to control unit 100. Additional hardware 102 may, however, function only as signal conversion between application unit 101 and control unit 100. If application unit 101 and control unit 100 have the possibility for direct communication, e.g. via a CAN or a Flex Ray or even an USB, then in some cases additional hardware 102 may be entirely omitted.

This means that example embodiments of the present invention, that is, the page switching method of the control unit according to example embodiments of the present invention, especially using overlay configuration tables, is applicable independently of the hardware, so that generally any connection by which the memory of the microcontroller can be changed, is suitable.

However, further on we shall specifically refer to the design having emulation probe 104 and conversion box 103, in order to avoid an incomprehensible description by taking into account all possible design variants. However, once having the knowledge of example embodiments of the present invention, it is no problem to transfer the method and the device according to example embodiments of the present invention to a large number of different design variants of the hardware.

The hardware that is connected directly to the control unit, that is, in this case, element 104, is called emulator probe below, and is abbreviated to ETK. This ETK is either incorporated in control unit 100 or is applied outside the control unit and connected to it. Depending on the type of the ETK, the connection may be made via the debug interface or to a parallel bus of the microcontroller. The control unit is expediently in operation while the measuring and adjusting tasks are being carried out. The control unit is mostly installed in the vehicle, in this context, but it may also be tested outside of laboratory conditions. In operation, the control unit assumes regulating tasks and control tasks, such as, in a motor vehicle, with regard to engine control or even brake control, transmission control, steering control basically the regulation and the control of any operating sequences, particularly in a motor vehicle, but also in machine tools in general, in automation or other applications.

In microcontroller 200 of control unit 100 there is also a read-write memory which is used to overlay data in another memory, for instance, a read-only memory, particularly a flash memory of the microcontroller. Thus, a first storage area of the microcontroller, especially a programmable read-only memory in the form of a flash memory, EEPROM memory, PROM memory, but also an ROM is overlaid by a second storage area. In the process, particularly the data in this first storage area of the microcontroller are faded out by other data. Because of this overlaying of the first storage area by the second storage area, it is possible, for instance, to measure parameters, visualize them on the PC, that is, application unit 101, and to change or customize them, while the control unit is fulfilling its operating task, especially in the vehicle.

With that, control unit 100 is able to be customized and optimized for the application in question, especially for the vehicle in question, particularly in operation, e.g. while the vehicle is participating in road traffic.

Figure 2:
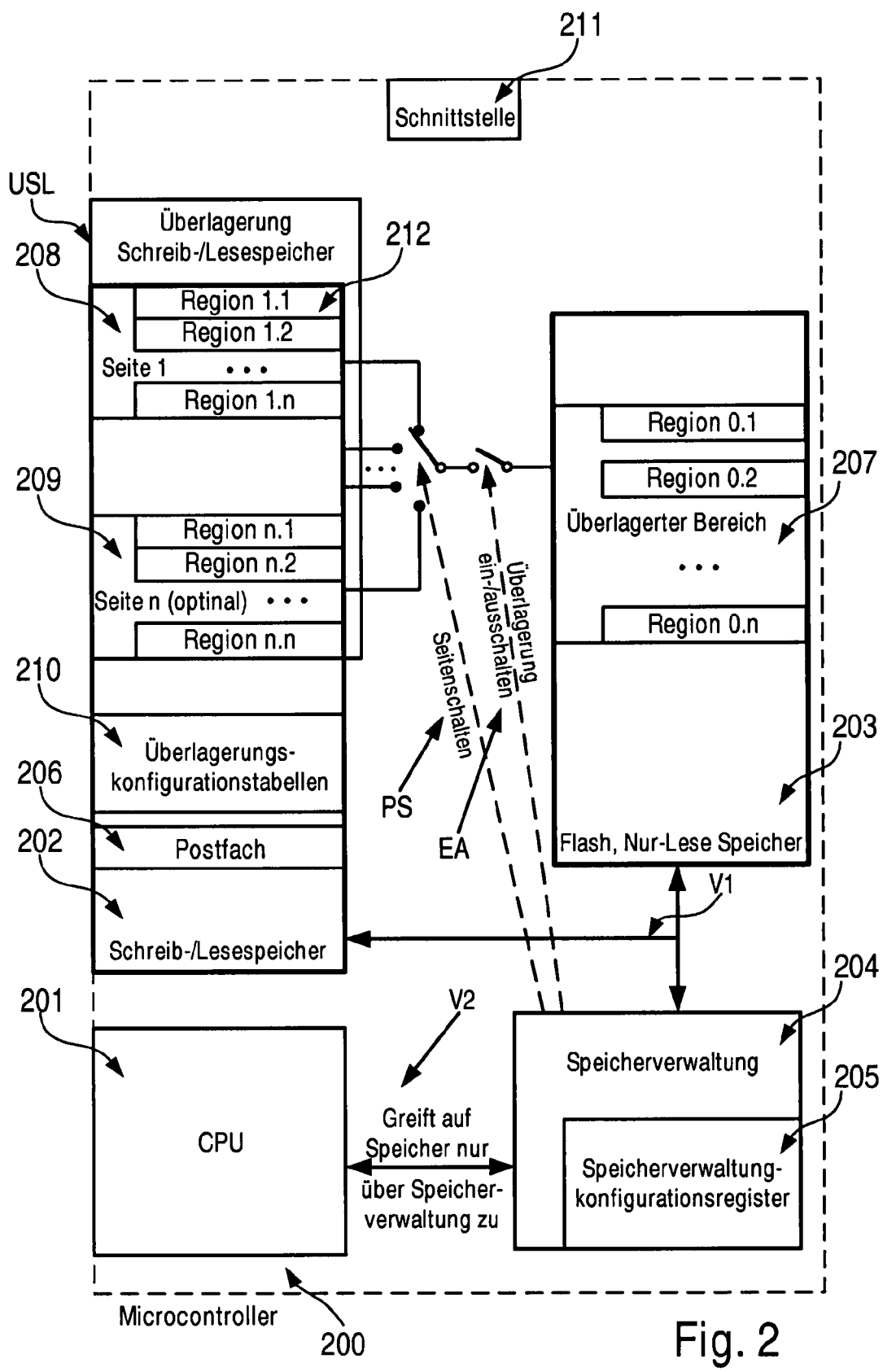
FIG. 2 illustrates the schematic design of a microcontroller to demonstrate the page switching method according to example embodiments of the present invention.

Now, FIG. 2 shows microcontroller 200 of control unit 100 which, besides the actual computing unit, that is, central processing unit CPU 201, also includes a first memory 203, a second memory 202, an interface 211 as well as a memory management 204. First memory 203, second memory 202 and memory management 204 are connected via first connection V1. CPU 201 is connected to memory management 204 via a second connection V2, that is, the CPU accesses the memories especially via memory management 204. Further units and components in the microcontroller, which are not relevant to the method, are omitted here for the sake of improved clarity. As was mentioned before, first memory 203 is, for instance, a flash memory, an EEPROM memory, an EPROM, a PROM, that is, in particular a programmed memory, it being also conceivable to have a read-only memory in the form of a ROM. This first memory 203 usually includes data and/or programs which the microcontroller in the control unit uses for carrying out the respective regulating task or control task. Read-write memory 202 may be developed as working memory, for instance, as a volatile memory, that is, as a RAM, but may also be developed, same as first memory 203, as a nonvolatile memory, that is, as described, as a programmable memory. In this case, however, particularly a RAM is used for memory 202. Interface 211 may be a serial as well as a parallel interface, and as was described above, this may be the debug interface; but any other connection or rather interface is also possible at this location, just as was mentioned, a CAN, a USB; a Flex Ray, a TTCAN, an XCP, etc. With the aid interface 211, particularly the debug interface, it is possible for the measuring and/or application system, that is, the application unit or application system 101, to change the content of second memory 202, that is, the read-write memory. Besides that, via this interface 211, application system 101 is also able to customize and change registers of the microcontroller, for example connection to the CPU. As was mentioned before, instead of a debug interface, any other interface, particularly a serial interface, may be used which offers access to the memory of the microcontroller.

The memory management also includes a memory management configuration register 205, which may also be influenced via interface 111. Read-write memory 202 may be accommodated in the microcontroller itself, but could also be located outside in the control unit, especially on additional hardware. Second memory 202 includes an area 210, in this instance, for accommodating the overlay configuration tables ÜKT, a special storage location designated here as mailbox and numbered 206, as well as memory pages 1 and 2, designated as 208 and 209, between which switching over may be performed and/or the overlaying may be switched on and off (EA), and which fade out an overlaid area in first memory 203, area 207 depending on the switching by page switching PS. In this context it is also possible that switching over between more than three pages could take place, for fading out overlaid area 207, so that security and possibilities of variations are enhanced further. This means then that the application device is in a position to fade out certain areas, especially a certain first area in first memory 203, namely, overlaid area 207 by overlaying memories, and thereby to adjust values while the control unit is in operation. For reasons of security and for reasons of variability there may exist a plurality of pages 208 and 209, and in this context, one of the pages may be omitted, since one may also interpret the original storage area as a memory page, between which switching may take place, in order, on the one hand, to increase the multiplicity of variants and, on the other hand, if necessary, to be able to return the control unit, or rather the systems controlled by the control unit to a more secure state. In this instance, the application system calls for a switching of the pages, according to the present invention, by writing a message into a declared storage location, such as mailbox 206 of the control unit. This means that a first storage area 207 is overlaid by a second storage area, shown in this case by USL, which includes at least two memory pages 208 and 209. Switching over between the two pages 208 and 209 that overlay storage area 207, and/or the switching on and off (EA) of the overlaying take place by page switching PS by memory management 204, to which access may be made by CPU 201, or even via interface 211 by the application system. The switching over then takes place automatically by control unit software or rather is executed by it. Because the control unit software carries out or triggers the switching itself, it may be ensured that no access is made to inconsistent data, since the current data are always present, and no intervention in this software takes place that generates overlapping inconsistencies. The calling for switching over by the application system is able to take place in particular by writing a switching identifier UK into a specified storage location, e.g. mailbox 206 of the control unit which is itself not used in the overlaying. The control unit software returns an acknowledgment concerning the occurrence of the page switching, for example, by writing a message to a storage location. An acknowledgment identifier BK is thus written especially into a specified storage location, for instance, also mailbox 206 of the control unit, which is also not used in the overlaying. The same storage location as 206 in this case, but also different storage locations, are able to be used for writing in switching identifier UK or acknowledgment identifier BK. The respective identifiers and messages are then evaluated. Thus, the application system evaluates the response of the control unit software, that is, acknowledgment identifier BK, and accesses mailbox 206 for this, via interface 211.

One is able to obtain still greater flexibility, and it is consequently advantageous for application system 101 if, during operation, the overlaid storage area, that is, 207 in this case, is able to be changed, and one is completely free in the choice of the page that is to overlay the respective storage area, in this context. In order to attain this broadened control of the page configuration by the applications system, the control unit has an overlay configuration table imparted to it. Such an acknowledgment identifier configuration table ÜKT includes instructions as to how the registers, that is, particularly the memory management configuration register, but also other registers or the storage locations, are to be modified by the control unit. During operation of the control unit it is thereby possible to determine the configuration, that is, particularly to change the allocation of the pages to certain overlaid areas, and thus to use the overlaying memory, that is, second memory 202, very efficiently and flexibly, in order to fade out first memory 203 at the appropriate first storage areas, the first storage areas, same as the pages of second overlay storage area USL being simply able to be set flexibly, and in a customizable and changeable manner. In this context, because of using the overlay configuration tables, the control unit software does not have to know the exact construction, the configuration and the utilization of the registers, but it only processes one table, namely overlay configuration table ÜKT, which includes all the required data for the modification of the storage areas and the storage locations, such as of mailbox 206.

CPU 201 is able to be triggered to process overlay configuration tables ÜKT, in storage area 210, by a message or an additional identifier. This causes registers 205 of memory management 204 to be set appropriately. The result is, that a certain area of overlay memory USL fades out first memory 203, or rather, area 207 that is to be overlaid. During operation, CPU 201 sees only the memory shown by memory management 204 of microcontroller 200, which in this case simply corresponds to at least one of the two pages 208 or 209 of overlay memory USL or to the original storage area. The emulation hardware, that is, in this case emulator probe ETK 104, controls microcontroller 200 with the aid of interface 211, in this context, especially the debug interface. It is possible to modify the memory content of the read-write memory, that is, the RAM or second memory 202, and thus both to change the data and also to influence CPU 201. Using an appropriate program that is processed in CPU 201, it is possible that CPU 201 reacts during the writing on mailbox 206 by the emulation hardware, that is, the ETK, and that it processes the overlay configuration tables from area 210. The registers of the memory management, that is, the memory management configuration registers 205 of microcontroller 200 are changed thereby. This, in turn, has the result that another area of the first memory, that is, in particular, of read-only memory 203, is faded out by read-write memory 202, especially by overlay area USL. In addition, by the use of the overlay configuration tables in storage area 210, it is also possible to change the size and the position of the area that is faded out, that is, of overlaid area 207, or, however, to switch off the overlaying. This is simply done, as was mentioned before, by processing the instructions in the overlay configuration table. In that table, it is specifically described how registers 205 are to be modified, and, as a function of these modifications, the changes in the size and position of the overlaid area that were described, as well as the size, position and which page of the overlaid area, are able to be adjusted during operation. Thus, for example, the starting and the end address of the overlaid area are shown, and so are the starting address and the end address of the overlaid area in the ÜKT. The size and the position of the respective storage areas are also able to be shown by using pointers in the ÜKT. The registers in the memory management are then simply filled with these pointers and/or the pointer addresses, or rather the starting addresses or end addresses for the respective areas, namely, the first and/or second storage area, which is to say, the overlaid area as well as the overlaying area. On the one hand, this gives application system 101 an extremely great measure of flexibility with respect to the configuration, and besides that, data inconsistencies are avoided since the control unit software itself is still carrying out the page switching, and also accesses the respective addresses and address pointers.

For the application of a control unit, in many cases it is meaningful to start by using an active overlay memory. That is, in the initialization phase, for instance, during booting up or even after a reset, it makes sense just to access overlay memory USL and corresponding page 208 or 209, and not first to initialize using overlaid area 207. With that, it is then possible to carry out the application directly from the booting up of the control unit. To accomplish this, a direct allocation of the control unit software to the overlay configuration tables in 210 can take place, so that the control unit software at initialization, that is, particularly at booting up, immediately processes the overlay configuration tables and thus starts at once with the overlay area, that is pages 208 and 209 from USL, instead of overlaid area 207. To do this, it is meaningful not to put the overlay configuration table in volatile storage. This can also take place by using a battery-backed memory or storage area, in which overlay configuration tables ÜKT are stored so that they are immediately available upon initialization. These overlay configuration tables do not first have to be imported into the control unit by application system 101, but are present there directly and are then particularly able to be used directly upon initialization. But even when ÜTK is not used directly upon initialization, it is meaningful to store it in a nonvolatile memory in the control unit, so that first of all no intervention of application system 101 has to take place within the scope of page switching.

In this context, each individual one of these pages may be made up of a plurality of regions, for each region one register of the memory management of microcontroller 200 being responsible respectively. That being the case, under certain circumstances it would not be possible to carry out the page switching all at once, so that the switching would occur successively which, as in the related art, could also lead to inconsistent data records. However, because the control unit software itself carries out the writing of registers 205 in the method according to example embodiments of the present invention, the page switching is able to take place at a time when the control unit software is especially not accessing the memories. This ensures that there is no overlap during memory access, and consequently, that the control unit software does not access inconsistent intermediate readings of the data. As was mentioned before, besides the design using two pages 208 and 209, any other number of pages would also be possible.

In particular, just one page is possible, the second configuration being then formed by the initial state of registers 205.

Now, the page switching method according to example embodiments of the present invention in a control unit, by overlay configuration tables particularly has the advantage compared to the related art that it is completely genetic, and the control unit software does not have to be customized, but is able to be used unchanged for different memory partitionings. When it comes to hardware changes, it is also possible to leave the measuring system and the application system unchanged, and only to customize the overlay configuration tables appropriately.

The method introduced is also demonstrable in the form of a computer program having program code, and made to be executed on a system as described in FIG. 1, which includes a device according to an example embodiment of the present invention. In this context, the computer program is also able to be stored on a data carrier that is computer-readable, for instance, a CD-ROM, a disk, a DVD, an EEPROM, an EPROM, a flash memory, a memory card, a chip card, a PROM, a ROM, a RAM or other storage media which are able to be read in any form by a computer. The representation as a computer program represents only a special form and is based on the same technical principles of example embodiments of the present invention.

What is claimed is:

1. A method for switching over in a memory for a control unit, a first storage area in the control unit being overlaid by a second storage area, the second storage area including at least two memory pages, each memory page configured to overlay the first storage area, comprising:
    performing, by software of the control unit:
    (i) switching over between an original non-overlaid memory configuration and an overlaid configuration in which one of the two memory pages of the second storage area overlays the first storage area, and
    (ii) switching over between overlaying the first storage area using a first one of the memory pages of the second storage area and overlaying the first storage area using a second one of the memory pages of the second storage area;
    in the non-overlaid memory configuration, read-accessing the first storage area using the control unit; and
    in the overlaid configuration, read-accessing the overlaying memory page in place of the first storage area, using the control unit.

2. The method according to claim 1, wherein at least one of (a) the switching over between the original non-overlaid memory configuration and the overlaid configuration and (b) the switching over between the overlaying of the first storage area using the first one of the memory pages of the second storage area and the overlaying of the first storage area using the second one of the memory pages of the second storage area is called for by an application system.

3. The method according to claim 2, wherein the application system calls for at least one of (a) the switching over between the original non-overlaid memory configuration and the overlaid configuration and (b) the switching over between the overlaying of the first storage area using the first one of the memory pages of the second storage area and the overlaying of the first storage area using the second one of the memory pages of the second storage area in that a switching identifier is written into a specified storage location of the control unit which is not used in the overlaying.

4. The method according to claim 1, wherein the software of the control unit acknowledges that at least one of (a) the switching over between the original non-overlaid memory configuration and the overlaid configuration and (b) the switching over between the overlaying of the first storage area using the first one of the memory pages of the second storage area and the overlaying of the first storage area using the second one of the memory pages of the second storage area has taken place.

5. The method according to claim 4, wherein the software of the control unit acknowledges at least one of (a) the switching over between the original non-overlaid memory configuration and the overlaid configuration and (b) the switching over between the overlaying of the first storage area using the first one of the memory pages of the second storage area and the overlaying of the first storage area using the second one of the memory pages of the second storage area in that an acknowledgment identifier is written into a specified storage location of the control unit which is not used in the overlaying.

6. The method according to claim 1, wherein the first storage area, which is overlaid, is changeable during operation of the control unit in that the control unit changes the first storage area with the aid of an overlay configuration table.

7. The method according to claim 6, wherein the overlay configuration table is written into the control unit by an application system and is changed during the operation.

8. The method according to claim 6, wherein in response to an initialization process, the control unit processes the overlay configuration table, and immediately upon the initialization, the first storage area is overlaid by the second storage area.

9. The method according to claim 6, wherein switching over is performed by setting values of registers in a memory management unit based on the overlay configuration table, the register values indicating which one of (i) the first storage area and (ii) at least one of the two memory pages in the second storage area, is accessible by the control unit.

10. The method according to claim 1, further comprising:
updating content of the first storage area after switching to the overlaid configuration.

11. The method according to claim 10, further comprising:
performing, by the software of the control unit, a switch back to the non-overlaid configuration after the content of the first storage area has been updated.

12. A device for switching over in a memory for a control unit, comprising:
a first storage area in the control unit;
a second storage area, the first storage area being overlaid by the second storage area, the second storage area including at least two memory pages;
wherein the device is configured such that each of the memory pages is able to overlay the first storage area, and wherein (i) switching over between an original non-overlaid memory configuration and an overlaid configuration in which one of the two memory pages of the second storage area overlays the first storage area, and (ii) switching over between overlaying the first storage area using a first one of the memory pages of the second storage area and overlaying the first storage area using a second one of the memory pages of the second storage area are performed by software of the control unit;
wherein the control unit is configured to perform read-accesses to the first storage area in the non-overlaid memory configuration; and
wherein the control unit is configured to perform read-accesses to the overlaying memory page in place of the first storage area in the overlaid configuration.

13. The device according to claim 12, wherein at least one storage location is provided which is not used in the overlaying, and into which a switching identifier is written to call for the switching over.

14. The device according to claim 12, wherein at least one storage location is provided which is not used in the overlaying, and into which an acknowledgment identifier is written to acknowledge the switching over.

15. The device according to claim 12, wherein an overlay configuration table is written into the control unit by an application system, and the device is configured such that the overlay configuration table is able to be changed during operation.

16. The device according to claim 15, wherein the device is configured such that, in response to an initialization process, the control unit processes the overlay configuration table, and, immediately upon the initialization, the first storage area is overlaid by the second storage area.

17. The device according to claim 12, wherein a storage area is provided for an overlay configuration table, and the device is configured such that the first storage area which is overlaid is able to be changed during operation of the control unit in that the control unit changes the first storage area with the aid of the overlay configuration table.

18. The device according to claim 17, wherein the storage area having the overlay configuration table is configured such that even after power supply of the device is switched off, the overlay configuration table remains intact.

19. A non-transitory computer-readable storage medium encoded with instructions configured to be executed by a processor, the instructions which, when executed by the processor, cause the performance of a method for switching over in a memory for a control unit, a first storage area in the control unit being overlaid by a second storage area, the second storage area including at least two memory pages, each memory page configured to overlay the first storage area, the method including:
performing by software of the control unit:
(i) switching over between an original non-overlaid memory configuration and an overlaid configuration in which one of the two memory pages of the second storage area overlays the first storage area, and
(ii) switching over between overlaying the first storage area using a first one of the memory pages of the second storage area and overlaying the first storage area using a second one of the memory pages of the second storage area;
in the non-overlaid memory configuration, read-accessing the first storage area using the control unit; and
in the overlaid configuration, read-accessing the overlaying memory page in place of the first storage area, using the control unit.

* * * * *

UNITED STATES PATENT AND TRADEMARK OFFICE
CERTIFICATE OF CORRECTION

PATENT NO.        : 8,464,016 B2
APPLICATION NO.   : 11/921132
DATED             : June 11, 2013
INVENTOR(S)       : Moessner et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1149 days.

Signed and Sealed this
Eighth Day of September, 2015

Michelle K. Lee
*Director of the United States Patent and Trademark Office*